United States Patent
Amano et al.

(10) Patent No.: US 7,109,256 B2
(45) Date of Patent: Sep. 19, 2006

(54) SURFACE-MODIFIED INORGANIC OXIDE POWDER, PROCESS FOR PRODUCING THE SAME, AND USE THEREOF

(75) Inventors: Yuki Amano, Yokkaichi (JP); Naruyasu Ishibashi, Yokkaichi (JP); Takeyoshi Shibasaki, Yokkaichi (JP)

(73) Assignee: Nippon Aerosil Co., Ltd. (NAC), Tokyo (JP)

( * ) Notice: Subject to any disclaimer, the term of this patent is extended or adjusted under 35 U.S.C. 154(b) by 0 days.

(21) Appl. No.: 10/176,547

(22) Filed: Jun. 24, 2002

(65) Prior Publication Data

US 2003/0027896 A1 Feb. 6, 2003

Related U.S. Application Data

(63) Continuation of application No. PCT/JP00/09413, filed on Dec. 22, 2000.

(30) Foreign Application Priority Data

Dec. 24, 1999 (JP) .......................... 11-367535

(51) Int. Cl.
C08K 9/06 (2006.01)
B32B 27/20 (2006.01)

(52) U.S. Cl. ...................... 523/212; 523/205; 428/391; 428/403; 428/405; 428/407

(58) Field of Classification Search ................ 523/205, 523/212; 428/391, 403, 405, 407
See application file for complete search history.

(56) References Cited

U.S. PATENT DOCUMENTS

| | | | |
|---|---|---|---|
| 4,477,607 A | | 10/1984 | Litke |
| 4,713,405 A | | 12/1987 | Koga et al. |
| 4,849,022 A | * | 7/1989 | Kobayashi et al. ......... 106/490 |
| 4,985,477 A | * | 1/1991 | Collins et al. .............. 523/212 |
| 5,354,833 A | * | 10/1994 | Dziark ....................... 528/36 |
| 5,486,420 A | * | 1/1996 | Nishihara et al. ........... 428/405 |
| 5,561,176 A | * | 10/1996 | Garafalo et al. ............ 523/213 |
| 5,843,525 A | * | 12/1998 | Shibasaki et al. ........... 427/214 |
| 5,889,090 A | | 3/1999 | Tooley et al. |
| 5,891,600 A | * | 4/1999 | Okuno et al. ................ 430/45 |
| 6,165,663 A | * | 12/2000 | Baba et al. ............... 430/111.3 |
| 6,224,980 B1 | * | 5/2001 | Komai et al. ............... 428/403 |

FOREIGN PATENT DOCUMENTS

| | | |
|---|---|---|
| EP | 251176 | 1/1988 |
| EP | 498942 A1 * | 8/1992 |
| EP | 0 860 478 | 8/1998 |
| JP | 63-43976 | 2/1988 |
| JP | 5-139726 | 6/1993 |

OTHER PUBLICATIONS

Nippon Aerosil Co., Ltd., Pamphlet pp. 1–12, "Technical Bulletin Aerosil, Hydrophobic Silica Aerosil R972 No. 3", (with partial English Translation ).

"Technical Bulletin Aerosil No. 22", First Edition, pp. 1–11 and 33–34, Feb. 1995, (with it's English counterpart, reference AY below).

Degussa AG, "Technical Bulletin Pigments, Aerosil for Solvent–Free Epoxy Resins, No. 27", pp. 1–11, 33 and 36, Dec. 1995.

English Translation of JP 5–139726 Jun. 1993 Nakamara et al.

English Translation of JP 06–228457 Kuramoto et al. Aug. 1994.

* cited by examiner

*Primary Examiner*—Jeffrey B. Robertson
(74) *Attorney, Agent, or Firm*—Oblon, Spivak, McClelland, Maier & Neustadt, P.C.

(57) ABSTRACT

A surface modified inorganic oxide powder is provided, which includes inorganic oxide particles having a surface modified with a mixed solution, which includes an organopoly-siloxane and a silane compound, in the presence of an acid or a base.

14 Claims, No Drawings

SURFACE-MODIFIED INORGANIC OXIDE POWDER, PROCESS FOR PRODUCING THE SAME, AND USE THEREOF

FIELD OF THE INVENTION

This invention relates to a surface modified inorganic oxide powder, process for producing the same, and use thereof, wherein said powder is used in a polar resin compound, such as a polar resin adhesive, to improve viscosity increasing, filling for reinforcement, and an adhesiveness etc.

BACKGROUND OF THE INVENTION

It has been known in general that a silicone oil, etc., modifies a surface of an inorganic oxide fine powder. For example, in the "TECHNICAL BULLETIN Aerosil No.22" (published by Nippon AEROSIL Co.), which is published by the inventors, a silica powder dry-treated with polydimethylsiloxane, is shown, and an example was shown, in which said silica powder is used for an epoxy adhesives. Moreover, in U.S. Pat. Nos. 4,477,607, and 4,713,405, regarding the silica powder dry-treated with polydimethylsiloxane, the examples are shown, in which said silica powder is added to a cyanoacrylate adhesive as a viscosity increasing agent.

Such a surface modified inorganic oxide powder is used widely for the purpose of the viscosity increasing or an addition of thixotropy, as a filler of the polar resin, such as an epoxy resin, an urethane resin, and a polyester etc. In such application, viscosity increasing, thixotropy, and stability with the passage of time are important factors. In recently, the additional agent is required, which can give high viscosity and high thixotropy by less addition than before use, and also has the excellent stability with the passage of time.

Present inventors proposed previously the inorganic oxide powder, which is useful about improvement of fluidity, prevention of coagulation, and adjustment of electrostatic charge, etc., of the powder materials, with such viscosity increasing and filling for reinforcement (Japanese Patent Laid Open, Hei 09-59533). This powder is the surface modified inorganic oxide powder made by two stages process, wherein the inorganic oxide powder, such as silica, is treated with alkylsilane, and further with an organo-poly-siloxane having functional groups, such as a halogen group, a hydroxyl group, and an alkoxy group, at the both ends of main chain. Consequently, said oxide powder has the excellent stability with the passage of time and the surface treatment effectiveness.

DISCLOSURE OF THE INVENTION

The present invention proposed the surface modified inorganic oxide powder, which has been improved further the above-mentioned surface modified inorganic oxide powder, and is excellent in the stability with the passage of time, viscosity increasing and thixotropy, and can raise viscosity increasing or thixotropy very much at the time of kneading in the polar resin. In addition, the present invention also proposed its production process and application.

That is, the present invention relates to the surface modified inorganic oxide powder, in which the mixed solution of an organo-poly-siloxane and a silane compound are used as a surface treatment agent under the existence of an acid or a base. It is preferably that the mixing ratio of the organo-poly-siloxane and the silane compound (organo-poly-siloxane/silane compound) is 200/1 to 1/1 by weight.

It is preferably that the surface modified inorganic oxide powder of the present invention is treated by using organo-poly-siloxane shown in the following general formula [1].

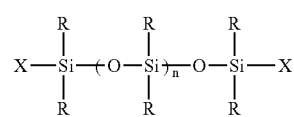

Where, R is hydrogen or an alkyl group, and it is available that a part of alkyl group is replaced by a vinyl group, a phenyl group, a poly-ether group, an epoxy group, or an amino group, and R combined with each Si is the same species or different species. X is R or a hydrolysis group comprising a halogen atom, a hydroxyl group, or an alkoxyl group, and n is an integer of 15 to 500.

Furthermore, it is preferably that the surface modified inorganic oxide powder of the present invention is treated by using dimethyl-poly-siloxane having viscosity of 10–2000 cSt at 25° C.

In addition, it is preferably that the surface modified inorganic oxide powder of the present invention is treated by using the silane compounds shown in the following general formula (2), (3) or (4), or an alkyl-silane comprising a mixture of these silane compounds.

$$R\ SiX_3 \tag{2}$$

$$R^1R^2SiX_2 \tag{3}$$

$$R^1R^2R^3SiX \tag{4}$$

Where, R is an alkyl group, X is a halogen atom, a hydroxyl group, or an alkoxy group, but it is available that $R^1$, $R^2$, and $R^3$ of the formula (3) and (4) are same species or different species, and the number of carbon in at least one of them is more than 6, preferably.

Moreover, it is preferably that the surface modified inorganic oxide powder of the present invention is treated by using the alkyl-silane shown in general formula (2), where the number of carbon in R is more than 6, and X is a methoxy group or an ethoxy group.

In addition, it is preferably that the surface modified inorganic oxide powder of the present invention is treated under an existence of an inorganic acid or an organic acid when the mixed-solution of the organo-poly-siloxane and the silane compound is acidic, or under an existence of ammonia or an amin shown in the following general formula (5) when said mixed solution is basic.

$$N\ R^1R^2R^3 \tag{5}$$

Where $R^1$, $R^2$, and $R^3$ are hydrogen, a methyl group, or an ethyl group, and it is available that a part of said formula is replaced with the functional group having a vinyl group, a phenyl group, and an amino group.

Regarding the surface modified inorganic oxide powder of the present invention, it is preferably that an extraction rate with normal-hexane is less than 30%, the inorganic oxide powder has the specific surface area of 100 to 400 $m^2/g$ by BET. The inorganic oxide powder of the present invention is the composite oxide of silica, titania, and aimina, or more than 2 kinds of these materials.

In addition, the present invention relates to the producing process of the surface modified inorganic oxide powder, comprising adding an acid, an amine, or ammonia to the mixed solution of the organo-poly-siloxane and the silane compound to make the surface treatment liquid, and spraying said surface treatment liquid on the inorganic oxide powder under ammonia gas atmosphere inside of a reaction system, or dipping the inorganic oxide powder into said surface treatment liquid, and heating said powder.

The above-mentioned producing process of the present invention is the surface modified process, that is, for example, 0.01 to 1 weight part of an acid, an amin, or ammonia is added to 100 weight part of the solution, in which the organo-poly-siloxane and the silane compound are mixed to the ratio of 200/1 to 1/1 by weight, to prepare the surface treatment liquid, and while stirring under non-oxidizing atmosphere, said surface treatment liquid is sprayed on the inorganic oxide powder to be heated at 200° C. to 400° C.

Furthermore, the present invention relates to the polar resin compound, in which one of the surface modified inorganic oxide fine powder mentioned above is included less than 50% by weight. Specifically, for example, said polar resin compound is the urethane resin, the epoxy resin, the acrylic resin, the unsaturated polyester resin, the vinyl ester resin, or the silicone denatured resin, as the main component, and is used as the adhesive or the sealant.

(I) Inorganic Oxide Powder

As the inorganic oxide powder used for the present invention, silica, titania, alumina, or a composite oxide powder of more than two kinds of them, can be used. Regarding such inorganic oxide powders, it is suitable that the specific surface area, which is measured by the nitrogen adsorbing method, that is called by BET method, is 100 to 400 m²/g. When the specific surface area is less than 100 m²/g, the effect of the high viscosity increasing is not obtained, and when said specific surface area is more than 400 m²/g, such a powder is hard to obtain due not to be marketed yet.

As the concrete example of the silica powder, it is preferably that the silica powder is made by the flame hydrolysis of a silicon halide compound, and has the specific surface area of 100 to 400 m²/g by BET, that is so-called a humid silica. This humid silica is commercialized by the brand name of AEROSIL 130, 200, 300, and 380, TT600, and MOX170 (made by NIPPON AEROSIL CO., LTD)

(II) Organo-poly-siloxane

Regarding the organo-poly-siloxane used in the present invention as the surface treatment agent, it is preferably that said substance is shown in the following general formula [1].

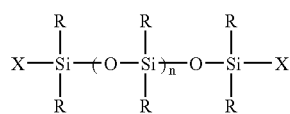

[1]

Where, R is hydrogen or an alkyl group, and it is available that a part of alkyl group is replaced by a vinyl group, a phenyl group, a poly ether group, an epoxy group, or an amino group, and R combined with each Si is same species or different species. X is R or a hydrolysis group comprising a halogen atom, a hydroxyl group, or an alkoxy group and n is an integer of 15 to 500.

It is preferably that above-mentioned organo-poly-siloxane has the viscosity of 10 to 2000 cSt at 25° C. When the viscosity is less than 10 cSt, it is not preferably that said organo-poly-siloxane is volatilized by heating at the time of surface-treating the metal oxide powder, such as silica, so that the surface treatment becomes insufficient. On the other hand, when the viscosity is more than 2000 cSt, the uniform surface treatment becomes difficult since the viscosity is too high. In the organo-poly-siloxane, dimethyl-poly-siloxane, etc., can be obtained easily as a commercial product, so that it is easy to use. The brand names of the commercialized organo-poly-siloxane are shown in the following.

Product made by Shinetu Kagaku Kogyo Co.LTD: KF96 (dimethyl type), KF99 (methyl-hydrogen type), KF50 (methyl-phenyl type), KF410 (alkyl-denatured type), KF105 (epoxy denatured type), KF860 (amino denatured type)

Product made by TORAY•Dow Corning•Silicone Co. LTD: SH200 (dimethyl type), SH550 (methyl-phenyl type), SH1107 (methyl hydrogen type), SF8416 (alkyl denatured type), SH8400 (poly ether denatured type), PRX413 (both ends are hydroxyl group type)

Product made by Toshiba Silicone Co. LTD: TSF451 (dimethyl type), TSF431 (methyl-phenyl type), TSF4420 (alkyl denatured type), TSF4440 (poly ether denatured type)

(III) Alkyl-silane

In the present invention, it is suitable that the silane compound has the following general formula shown in (2), (3), or (4).

Where, R is an alkyl group, X is a halogen atom, a hydroxyl group or an alkoxy group, but it is available that $R^1$, $R^2$, and $R^3$ of the formula (3) and (4) are same species or different species, and it is preferably that at least one of these alkyl groups has more than 6 carbons. Among these alkyl silanes, the alkyl-silane shown in the general formula (2), wherein the number of carbon of R is more than 6, and X is the methoxy group or the ethoxy group, can be received easily to use. Regarding these alkyl-silanes, the brand names of commercialized products are shown in followings. Besides these alkyl-silanes, disilmethyl-dimethoxy-silane, or a dihexyl-dimethoxy-silane etc. can be used.

Product made by Shinetu Kagaku Kogyo Co. LTD: KBM3063 (hexyl-trimethoxy-silane), KBM3083 (octyl-trimethoxy-silane), KBM3103c (disil-trimethoxy-silane)

Product made by TORAY•Dow•Corning•Silicone Co. LTD: AY43-216MC hexadisil-trimethoxy-silane), AY43-218MC (octadisil-trimethoxy-silane)

Product made by Degussa-Huels Co.LTD: Si108 (octyl-trimethoxy-silane), Si208 (octyl-triethoxy-silane), DYNA-SYLAN9116

(IV) Surface Modification Process

The surface modified inorganic oxide powder of the present invention is that the organo-poly-siloxane chain and alkylsilil group are formed on the surface of the inorganic oxide powder, by surface-treating under the existence of the acid or the base in use of the mixed-solution of the organo-poly-siloxane and the silane compound as the treatment agent. By such surface treatment, the polar resin can be adsorbed on the surface of inorganic oxide powder easily by preparing. In addition, the inorganic oxide powder becomes entangled with the polar resin chain to enhance the effect of viscosity increasing. Such surface-treated inorganic oxide powder has higher viscosity increasing than the powder surface-treated by only the organo-poly-siloxane or the alkyl-silane.

Moreover, in the surface treatment with two stages, where the inorganic oxide powder is treated by the alkoxy-silane at first and the silicone oil next, the cooling process between each treatment process is necessary, so that the process becomes complicated and the treatment time becomes also long. On the other hand, according to the one stage treatment using the above-mentioned mixed treatment liquid as this invention, the treatment process is simplified and the its effect is also high.

It is preferably that the mixing ratio of the organo-poly-siloxane and the silane compound (organo-poly-siloxane/silane compound) is 200/1 to 1/1 by weight. When the organo-poly-siloxane is less than the silane compound, the sufficient effect of the viscosity increasing is not obtained at the time of blending the surface-modified inorganic oxide powder to the resin. In addition, when the amount of the organo-poly-siloxane is more than the mixing ratio mentioned above, the variation with the passage of time of the viscosity becomes large at the time of blending with the resin. On the other hand, the silane compound is more than said mixing ratio, the amount of the surface treatment agent remaining on the surface of the powder becomes to increase, so that the rate of the hexane extraction becomes to increase remarkably.

The surface modified inorganic oxide powder of the present invention is that the above-mentioned mixed solution is used under the existence of the acid or the base. When the mixed solution of the organo-poly-siloxane and the silane compound is basic, ammonia or an amin, such as, diethylamin, or triethylamin etc. is used. In addition, when said solution is acidic, an organic acid, such as an acetic acid etc., or an inorganic acid, such as hydrochloric acid, or nitric acid, etc., is used.

Regarding to the amount of the acid or the base to the mixed solution of the organo-poly-siloxane and the silane compound, it is good that said amount can give the catalytic action. In general, 0.01 to 1 weight part of acid or base is suitable to 100 weight part of the mixed solution of the organo-poly-siloxane and the silane compound. When the amount of addition is more than said range, the effect is saturated, so that it is not economical. Moreover, when the amount of addition is less than said range, although the effect is obtained depending on the condition of the heat treatment or the kind of acid or base, the setup of the conditions is difficult.

In addition, when the above-mentioned acid or base are not used, the equivalent effect can be obtained by adjusting the reaction temperature and the reaction time. However, by adding the acid or the base to the above-mentioned mixed solution to be used, the reaction can be promoted, so that the treatment effect can be increased, and the reaction time can be reduced. Therefore, the surface modified powder can be made cheaply, wherein the hexane extraction rate is low and the variation with the passage of time of viscosity is very low. It is available that a solvent is added to said surface treatment agent, i.e.,the organo-poly-siloxane, the silane compound, acid, or basic, if necessary.

In the process of the surface treatment, it can be done that the surface treatment agent is used, in which the acid or the base is added to the mixing solution of the above-mentioned organo-poly-siloxane and silane compound, and the inorganic oxide powder is sprayed or dipped with said surface treatment liquid to be heated. Specifically, for example, the inorganic oxide powder is put into the container equipped with a stirring means, such as a Henshell mixer, and while stirring under non-oxidizing atmosphere, the acid or the base is added to the organo-poly-siloxane and the alkyl-silane. It is preferably that the surface treatment liquid is sprayed on the inorganic oxide powder to be mixed uniformly.

Regarding the addition of the organo-poly-siloxane and the silane compound, 1 to 50 weight parts of the organo-poly-siloxane and 1 to 50 weight parts of the silane compound are suitable to 100 weight parts of the inorganic oxide powder, according to the specific surface area value of said inorganic oxide powder. When these surface treatment agents are less than 1 weight part, the generated substance by the reaction cannot cover the surface of the inorganic oxide powder sufficiently, so that the treatment effect becomes insufficient. On the other hand, when these surface treatment agents are added more than 50 weight parts, the treatment effect is saturated, so that it is not economical.

After the above-mentioned surface treatment liquid is added to the inorganic oxide powder to be mixed uniformly, said mixed powder is heated for more than 10 minutes at the temperature range of 200° C. to 400° C. When the heating temperature is less than 200° C., the reaction becomes insufficient, and the generated substance by the reaction is not combined firmly with the surface of the inorganic oxide powder. Although it is preferably that the processing temperature is high so that the treating time is shortened, when the temperature is more than 400° C., the heat decomposition of the organo-poly-siloxane is started, so that it is not suitable. It is preferably that the heating atmosphere is non-oxidizing atmosphere, such as nitrogen gas.

(V) Rate of Hexane Extraction

The stability of the surface treatment can be evaluated quantitatively by the rate of extraction of normal-hexane. The rate of extraction of normal-hexane is defined by the following formula (6). In addition, the extraction weight is the amount of the extracted treatment agent, and the weight of before extraction is the amount of the treatment agent adhering on the surface of the powder before extraction.

Rate of extraction of normal hexane (%)=(Weight of extraction(g)/Weight of before extraction(g))×100        (6)

Specifically, for example, 15 g of the sample is taken into a four-mouth flask of 2 L, and 500 mL of normal-hexane is added to this flask. After replacing to nitrogen inside of the system, said sample is refluxed with stirring for 6 hours at 55° C. and the extraction liquid is separated. In addition, this extraction liquid is separated to the solid from the liquid to be condensed, i.e., the solvent is removed. Then the rate of normal-hexane extraction is defined by the ratio of the amount of the treatment agent for extraction and the amount of the treatment agent adhering to the surface of the powder before extraction. Moreover, the amount of the treatment agent adhering to the surface of powder before extraction, is measured by the difference between the weight of powder before surface-treatment and after surface-treatment. It is preferably that the rate of extraction is less than 30%.

When this rate of extraction is high, the surface treatment agent has left from the inorganic oxide surface mostly, and the surface treatment agent is not be fixed sufficiently with chemically or physically on the surface of inorganic oxide powder. Therefore, when this inorganic oxide powder is kneaded into the resin etc., the stability with the passage of time becomes low.

(VI) Resin Compound

By the above-mentioned surface treatment, the surface modified inorganic oxide powder, which is excellent in the stability with the passage of time and can raise the viscosity increasing and the thixotropy very much at the time of kneading into the polar resin, is obtained. Specifically, by adding the surface modified inorganic oxide fine powder of the present invention to the polar resin, the viscosity increasing or the thixotropy of this polar resin compound is improved remarkably. Especially, in the polar resin adhesives or the sealant, in which the main component is an urethane resin, an epoxy resin, an acrylic resin, an unsaturated polyester resin, a vinyl ester resin, or a silicone denaturation resin, the remarkable effect of the viscosity increasing and the improvement effect of the thixotropy are obtained. Moreover, regarding the amount of the addition of the surface modified inorganic oxide fine powder of the present invention to these resins, it is suitable that is less than 50% by weight.

EXAMPLE AND COMPARISON EXAMPLE

Hereafter, the present invention is explained more concretely with the examples and the comparison examples. In addition, the range of the present invention is not limited by these examples. Moreover, the viscosity is measured in 2.5 rpm by using E type viscometer made by Told Sangyo Co.LTD, and the thixotropy value is measured at 20 rpm Example 1

100 g of the silica powder (the brand name is Aerosil 200) having the specific surface area of 200 $m^2/g$ by BET, which was made by a vapor phase method, was taken into the reaction container, and while stirring under nitrogen atmosphere, the mixed solution comprising 20 g of the silicone oil (the brand name is KF96-50 cs, made by Shinetu Kagaku Kogyo Co. LTD), 4.5 g of decyl-trimetoxi-silane, and 0.1 g of dietylamin to 100 g of the silica powder, was sprayed. After heating for 20 minutes at 350° C. with stirring, said powder was cooled to prepare the surface modified silica fine powder. In addition, 10 g of this surface treated silica was dispersed in 300 ml of hexane, and after refluxing for 2 hours with heating, said dispersed solution was separated from liquid to solid by using a filter. The rate of hexane extraction of the surface modified silica, which was obtained from the remaining weight of said filtrated liquid done by the reduced pressure distillation, was 14%. Moreover, 7.5 g of this surface modified silica powder was mixed into 142.5 g of the epoxy resin (Epicoat 828 made by Yuka-Shell Epoxy Co. LTD) to stirre for 3 minutes at 3000 rpm by the homo-mixer (made by Tokusyu Kika Kogyo Co. LTD), and this mixed substance was de-bubbled to save for 2 hours at 22° C. When the viscosity of said saved substance was measured, it was 175 Pa·s, and the thixotropy value was 2.7. Furthermore, the viscosity of said substance after saving for 30 days in a container, where temperature and humidity were kept constant at 40° C., was 172 Pa·s, and the thixotropy value was 2.7.

Example 2

The surface modified silica fine powder was prepared like Example 1 by using the mixed solution of 100 g of the silica powder having the specific surface area of 200 $m^2/g$ by BET, which was made by the vapor phase method (the brand name is Aerosil 200), 20 g of the silicone oil (the brand name is KF96-50 cs made by Shinetsu Kagaku Kogyou Co. LTD), 5.8 g of decylmethyidimethoxid-silane, and 0.1 g of diethylamin, and its rate of hexane extraction, the viscosity, and the thixotropy value were measured. The rate of hexane extraction was 11%, the viscosity was 166 Pa·s, and the thixotropy value was 2.6. Moreover, the viscosity of said substance after saving for 30 days in the container, where temperature and humidity were kept constant at 40° C., was 165 Pa·s, and the thixotropy value was 2.6.

Example 3

The surface modified silica fine powder was prepared like Example 1, by using the mixed solution of 100 g of the silica powder having the specific surface area of 130 $m^2/g$ by BET, which was made by the vapor phase method (the brand name is Aerosil 130), 20 g of the silicone oil (the brand name is KF96-50 cs made by Shinetsu Kagaku Kogyo Co. LTD), 5.4 g of hexadecyltrimethoxi-silane, and 0.1 g of triethylamin, and its rate of hexane extraction, viscosity, and thixotropy value were measured. The rate of hexane extraction was 18%, the viscosity was 180 Pa·s, and the thixotropy vaalue was 2.9. Moreover, the viscosity of said substance after saving for 30 days in the container, where temperature and humidity were kept constant at 40° C., was 175 Pa·s, and the thixotropy value was 2.9.

Example 4

The surface modified silica fine powder was prepared like Example 1, by using the mixed solution of 100 g of the silica powder having the specific surface area of 130 $m^2/g$ by BET, which was made by the vapor phase method (the brand name is Aerosil 130), 20 g of the silicone oil (the brand name KF96-50 cs made by Shinestu Kagaku Kogyo Co. LTD), 0.5 g of hexadecyltrimethoxi-silane, and 0.5 g of diethylamin, and its rate of hexane extraction, viscosity, and thixotropy value were measured. The rate of hexane extraction was 10%, the viscosity was 185 Pa·s, and the thixotropy value was 2.9. Moreover, the viscosity of said substance after saving for 30 days in the container, where temperature and humidity were kept constant at 40° C., was 182 Pa·s, and the thixotropy value was 2.9.

Example 5

The surface modified silica fine powder was prepared like Example 1, by using the mixed solution of 100 g of the silica powder having the specific surface area of 38 $m^2/g$ by BET, which was made by the vapor phase method (the brand name is Aerosil 380), 15 g of the silicone oil (brand name is KF96-50 cs made by Shinetsu Kagaku Kogyo Co. LTD), 15 g of oxtadecyltrimethoxi-silane, and 10 g of hydrochloric acid, and its rate of hexane extraction, viscosity, and thixotropy value were measured. The rate of hexane extraction was 16%, the viscosity was 170 Pa·s, and the thixotropy value was 2.6. Moreover, the viscosity of said substance after saving for 30 days in the container, where temperature and humidity were kept constant at 40° C., was 170Pa·s, and the thixotropy value was 2.7.

Example 6

The surface modified silica fine powder was prepared like Example 1, by using the mixed solution of 100 g of the silica powder having the specific surface area of 200 $m^2/g$ by BET, which was made by the vapor phase method (the brand name is Aerosil 200), 20 g of the silicone oil (the brand name is KF96-50 cs made by Shinetsu Kagaku Kogyo Co. LTD), 1.0 g of oxtadecyltrimethoxi-silane, and 1.0 g of acetic acid, and its rate of hexane extraction, viscosity, and thixotropy value were measured. The rate of hexane extraction was 15%, the viscosity was 188 Pa·s, and the thixotropy value was 2.9. Moreover, the viscosity of said substance after saving for 30 days in the container, where temperature and humidity were kept constant at 40° C., was 188 Pa·s, and the thixotropy value was 2.9.

Comparison Example 1

The surface modified silica fine powder was prepared like Example 1 excepting not to use diethylamin, by using the mixed solution comprising 100 g of the silica powder having the specific surface area of 200 m²/g by BET, which was made by the vapor phase method (the brand name is Aerosil 200), 20 g of the silicone oil (the brand name is KF96-50 cs, made by Shinetsu Kagaku Kogyo Co. LTD), and 4.5 g of decylmethyldimethoxi-silane, and its rate of hexane extraction, viscosity, and thixotropy value were measured. The rate of hexane extraction was 32%, the viscosity was 118 Pa·s, and the thixotropy value was 2.3. Moreover, the viscosity of said surface modified silica powder after saving for 30 days in the container, where temperature and humidity were kept constant at 40° C., was 137 Pa·s, and the thixotropy value was 2.1.

Comparison Example 2

The surface modified silica fine powder was prepared like Example 1 excepting not to use the silicon oil and diethylaminthe, by using the mixed solution of 100 g of the silica powder having the specific surface area of 200 m²/g by BET, which was made by the vapor phase method (the brand name is Aerosil 200), and 4.5 g of decylmethyldimethoxi-silane and its rate of hexane extraction, viscosity, and thixotropy value were measured. The rate of hexane extraction was 21%, the viscosity was 95 Pa·s, and the thixotropy value was 1.1. Moreover, the viscosity of said surface modified fine silica powder after saving for 30 days in the container, where temperature and humidity were kept constant at 40° C., was 110 Pa·s, and the thixotropy value was 1.1.

Comparison Example 3

The surface modified silica fine powder was prepared like Example 1 excepting not to use diethylamin, by using the mixed solution of 100 g of the silica powder having the specific surface area of 380 m²/g by BET, which was made by the vapor phase method (the brand name is Aerosil 380), 20 g of the silicone oil (the brand name is KF96-50 cs, made by Shinetsu Kagaku Kogyo Co. LTD), and 4.5 g of desiltrimethoxi-silane and its rate of hexane extraction, tviscosity, and thixo-tropy property were measured. The rate of hexane extraction was 28%, the viscosity was 127 Pa·s, and the thixotropy value was 2.4. Moreover, the viscosity of said surface modified fine silica powder after saving for 30 days in the container, where temperature and humidity were kept constant at 40° C., was 110 Pa·s, and the thixotropy value was 1.1.

Comparison Example 4

The surface modified silica fine powder was prepared like Example 1 excepting not to use decyltrimethoxi-silane, by using the mixed solution of 100 g of the silica powder having the specific surface area of 200 m²/g by BET, which was made by the vapor phase method (the brand name is Aerosil 200), 20 g of the silicone oil (the brand name KF96-50 cs, made by Shinetsu Kagaku Kogyou Co. LTD), and 0.1 g of diethylamin, and its rate of hexane extraction, viscosity, and thixo-tropy property were measured. The rate of hexane extraction was 16%, the viscosity was 146 Pa·s, and the thixotropy value was 2.4. Moreover, the viscosity of said surface modified fine silica powder after saving for 30 days in the container, where temperature and humidity were kept constant at 40° C., was 170 Pa·s, and the thixotropy value was 2.2.

Comparison Example 5

The surface modified silica fine powder was prepared like Example 1 excepting to use the mixed solution of 100 g of the silica powder having the specific surface area of 130 m²/g by BET, which was made by the vapor phase method (the brand name is Aerosil 130), 20 g of decylmethoxi-silane, and 0.g of triethylamin, and its rate of hexane extraction, the viscosity, and the thixotropy value were measured. The rate of hexane extraction was 42%, the viscosity was 92 Pa·s, and the thixotropy value was 1.2. Moreover, the viscosity of the substance after saving for 30 days in the container, where temperature and humidity were kept constant at 40° C., was 105 Pa·s, and the thixotropy value was 1.0.

The above-mentioned results were shown in Table 1 as contrasting. As shown from these results clearly, regarding each of the silica powder of present examples (A1 to A6), the rate of hexane extraction is as low as 14 to 18%, the viscosity is as high as 166 to 188 Pa·s, the thixotropy value is high comparatively. Moreover, the viscosity and the thixotropy value after saving are hardly changed, and have high stability with the passage of time. On the other hand, regarding the comparison examples (B1 to B5), when the silica powder having the same specific surface area as the present examples was used, all of the viscosity are low, and the variation of the viscosity after saving is large. Moreover, the rate of hexane extraction is high excepting for a part. By the way, regarding the viscosity of the examples of the present invention (A1 to A6), the difference between the 30 days after and the initial time (variation with the passage of time), is less than 3. On the other hand, regarding the viscosity of the comparison examples, said difference is 14–24, and the variation with the passage of time is very large.

Availability on Industry

The surface modified inorganic oxide powder of the present invention is excellent in the stability with the passage of time, and can remarkably raise the viscosity increasing and thixotropy at the time of kneading in the polar resin. Especially, in the polar resin adhesives or the sealant having the urethane resin, the epoxy resin, the acrylic resin, the unsaturated polyester resin, the vinyl ester resin, or the silicone denaturation resin, as the main component, the remarkable effect of the viscosity increasing and the improvement effect of thixotropy are obtained.

TABLE 1

| | Inorganic oxide powder | | Organopoly-Siloxane (A) | | Silane compound (B) | | A:B (weight ratio) | Acid or Base | Rate of hexane extraction | Viscosity (Pa · s) | | | Thixotropy value | | |
|---|---|---|---|---|---|---|---|---|---|---|---|---|---|---|---|
| No. | Kinds | BET | Kinds | amount | Kinds | amount | | | | Initial | 30 days | Variation | Initial | 30 days | Variation |
| A1 | Silica 100 g | 200 | Silicone oil | 20 g | Decyltrimethoxi-silane | 4.5 g | 200:45 | Diethyl-amine 0.1 g | 14% | 175 | 172 | −3 | 2.7 | 2.7 | 0 |

TABLE 1-continued

| No. | Inorganic oxide powder Kinds | BET | Organopoly-Siloxane (A) Kinds | amount | Silane compound (B) Kinds | amount | A:B (weight ratio) | Acid or Base | Rate of hexane extraction | Viscosity (Pa·s) Initial | 30 days | Variation | Thixotropy value Initial | 30 days | Variation |
|---|---|---|---|---|---|---|---|---|---|---|---|---|---|---|---|
| A2 | Silica 100 g | 200 | Silicone oil | 20 g | Decylmethyl-dimethoxisilane | 5.8 g | 200:58 | Diethyl-amine 0.1 g | 11% | 166 | 165 | −1 | 2.6 | 2.6 | 0 |
| A3 | Silica 100 g | 130 | Silicone oil | 20 g | Hexadecyl-trimethoxisilane | 5.4 g | 200:54 | Triethyl-amine 0.1 g | 18% | 180 | 180 | 0 | 2.9 | 2.9 | 0 |
| A4 | Silica 100 g | 130 | Silicone oil | 20 g | Hexamethyl-trimethoxisilane | 0.5 g | 200:5 | Diethyl-amine 0.5 g | 10% | 185 | 182 | −3 | 2.9 | 2.9 | 0 |
| A5 | Silica 100 g | 380 | Silicone oil | 15 g | Octadecyl-trimethoxisilane | 15 g | 200:200 | Hydrochloric acid 1.0 g | 16% | 170 | 170 | 0 | 2.6 | 2.7 | 0.1 |
| A6 | Silica 100 g | 200 | Silicone oil | 20 g | Octadecyl-trimethoxisilane | 1.0 | 200:10 | Acetic acid 1.0 g | 15% | 188 | 188 | 0 | 2.9 | 2.9 | 0 |
| B1 | Silica 100 g | 200 | Silicone oil | 20 g | Decyltrimethoxi-silane | 4.5 g | 200:45 | — | 32% | 118 | 137 | +19 | 2.3 | 2.1 | −0.2 |
| B2 | Silica 100 g | 200 | — | — | Decyltrimethoxi-silane | 4.5 g | 0:45 | — | 21% | 95 | 110 | +15 | 1.1 | 1.1 | 0 |
| B3 | Silica 100 g | 380 | Silicone oil | 20 g | Decyltrimethoxi-silane | 4.5 g | 200:45 | — | 28% | 127 | 141 | +14 | 2.2 | 2.1 | −0.3 |
| B4 | Silica 100 g | 200 | Silicone oil | 20 g | — | — | 200:0 | Diethyl-amine 0.1 g | 16% | 146 | 170 | +24 | 2.4 | 2.2 | −0.2 |
| B5 | Silica 100 g | 130 | — | — | Decyltrimethoxi-silane | 20 g | 0:200 | Triethyl-amine 0.1 g | 42% | 92 | 105 | +13 | 1.2 | 1.0 | −0.2 |

A1 to A4 are Example. B1 to B4 are Comparison Example. BET is comparative surface area by BET (m²/g). Initial is the initial value. 30 days is the after 30 days value. Variation is the variation with the passage of time, i.e., the difference between the initial value and after 30 days value.

This application is based on Japanese Patent Application No. 1999-367535, filed Dec. 24, 1999, and International Application No. PCT/JP00/09143, filed Dec. 22, 2000, the entire contents of each of which are hereby incorporated by reference.

What is claimed is:

1. A surface modified inorganic oxide powder, comprising inorganic oxide particles having a surface modified with a mixed solution comprising an organopoly-siloxane and a silane compound in the presence of an acid or a base; wherein
the organopoly-siloxane has the following formula (1):

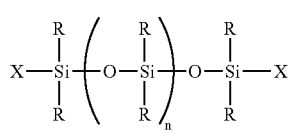

(1)

wherein R in formula (1) is each independently a hydrogen or an alkyl group, which alkyl group may be optionally substituted with a vinyl group, a phenyl group, a poly ether group, an epoxy group, or an amino group, X is R or a hydrolysis group selected from the group consisting of a halogen atom, a hydroxyl group and an alkoxy group, and n is an integer of 15 to 500; and wherein the silane compound has one of the following formulas (2), (3), or (4):

$R^1SiX_3$ (2)

$R^2R^3SiX_2$ (3)

$R^1R^2R^3SiX$ (4)

wherein $R^1$ in formula (2) is an unsubstituted alkyl group having more than 6 carbons;

wherein $R^2$ and $R^3$ in formula (3) and $R^1$, $R^2$, and $R^3$ in formula (4) are the same or different unsubstituted alkyl groups and at least one of $R^1$, $R^2$ and $R^3$ has more than 6 carbons;

and wherein X is a halogen atom, hydroxyl group or an alkoxy group.

2. The surface modified inorganic oxide powder according to claim 1, wherein a mixing ratio of the organopoly-siloxane and the silane compound (organopoly-siloxane/silane compound) is 200/1 to 1/1 by weight.

3. The surface modified inorganic oxide powder according to claim 1, wherein the organopoly-siloxane is a dimethylpoly-siloxane having a viscosity of 10–2000 cSt at 25° C.

4. The surface modified inorganic oxide powder according to claim 1, wherein X is a methoxy group or an ethoxy group.

5. The surface modified inorganic oxide powder according to claim 1, wherein when the surface is modified in the presence of an acid, the acid comprises an inorganic acid or an organic acid.

6. The surface modified inorganic oxide powder according to claim 1, wherein when the surface is modified in the presence of a base, the base comprises ammonia or an amine having the following formula (5)

$NR^1R^2R^3$ (5)

where $R^1$, $R^2$, and $R^3$ are each independently hydrogen, a methyl group, or an ethyl group, and may each independently be substituted with a vinyl group, a phenyl group, or an amino group.

7. The surface modified inorganic oxide powder according to claim 1, having a normal hexane extraction rate of less than 30%.

8. The surface modified inorganic oxide powder according to claim 1, wherein the inorganic oxide powder has a specific surface area of 100 to 400 m$^2$/g by BET.

9. The surface modified inorganic oxide powder according to claim 1, wherein the inorganic oxide powder is selected from the group consisting of silica, titania, alumina, and mixtures thereof.

10. A process for producing a surface modified inorganic oxide powder comprising:

contacting at least one selected from the group consisting of an acid, an amine, ammonia, and a mixture thereof with a mixed solution comprising an organopoly-siloxane and a silane compound to obtain a surface treatment liquid, contacting an inorganic oxide powder with said surface treatment liquid by at least one of the following (1), (2), and a combination thereof;

(1) spraying said surface treatment liquid on said inorganic oxide powder under ammonia gas atmosphere, or (2) dipping said inorganic oxide powder into said surface treatment liquid; and heating the powder;

to obtain said surface modified inorganic oxide powder;

wherein the organopoly-siloxane has the following formula (1):

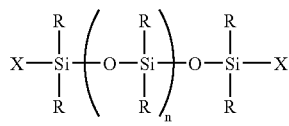 (1)

wherein R is each independently a hydrogen or an alkyl group, which alkyl group may be optionally substituted with a vinyl group, a phenyl group, a poly ether group, an epoxy group, or an amino group, X is R or a hydrolysis group selected from the group cosisting of a halogen atom, a hydroxyl group, and an alkoxy group, and n is an integer of 15 to 500;

and wherein the silane compound has one of the following formulas (2), (3), or (4):

$R^1SiX_3$ (2)

$R^2R^3SiX_2$ (3)

$R^1R^2R^3SiX$ (4)

wherein $R^1$ in formula (2) is an unsubstituted alkyl group having more than 6 carbons;

wherein $R^2$ and $R^3$ in formula (3) and $R^1$, $R^2$, $R^3$ in formula (4) are the same or different unsubstituted alkyl groups and at least one of $R^1$, $R^2$ and $R^3$ has more than 6 carbons;

and wherein X is a halogen atom, hydroxyl group or an alkoxy group.

11. The process for producing the surface modified inorganic oxide powder according to claim 10, wherein at least 0.01 to 1 parts by weight of the acid, amine, or ammonia are contacted with 100 parts by weight of the mixed solution, wherein the organopoly-siloxane and silane compound are present in the surface treatment liquid in an organopoly-siloxane/silane compound weight ratio ranging from 200/1 to 1/1, wherein the surface treatment liquid is sprayed on the inorganic oxide powder, while stirring the powder under a non-oxidizing atmosphere, and wherein the powder is heated at 200° C.–400° C.

12. A polar resin composite, comprising:

the surface modified inorganic oxide fine powder according to claim 1 in an amount of less than 50% by weight; and at least one polar resin.

13. The polar resin composite according to claim 12, wherein the polar resin comprises at least one resin selected from the group consisting of urethane resin, epoxy resin, acrylic resin, unsaturated polyester resin, vinyl ester resin, a silicone denaturation resin, and a mixture thereof.

14. An adhesive or sealant, comprising the polar resin composite according to claim 12.

* * * * *